(12) United States Patent
Ohara et al.

(10) Patent No.: US 7,416,807 B2
(45) Date of Patent: Aug. 26, 2008

(54) POLYMER ELECTROLYTE FUEL CELL

(75) Inventors: Hideo Ohara, Katano (JP); Toshihiro Matsumoto, Takatsuki (JP); Soichi Shibata, Hirakata (JP); Yasushi Sugawara, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 499 days.

(21) Appl. No.: 10/899,987

(22) Filed: Jul. 27, 2004

(65) Prior Publication Data

US 2005/0026024 A1 Feb. 3, 2005

(30) Foreign Application Priority Data

Aug. 1, 2003 (JP) ............... 2003-285313

(51) Int. Cl.
*H01M 8/02* (2006.01)
*H01M 8/10* (2006.01)

(52) U.S. Cl. .......................... 429/35; 429/36
(58) Field of Classification Search .................. 429/35, 429/36
See application file for complete search history.

(56) References Cited

U.S. PATENT DOCUMENTS 6,231,053 B1   5/2001   Wakamatsu

2002/0055032 A1   5/2002   Wakahoi et al.
2003/0082429 A1   5/2003   Nishimura et al.
2003/0141672 A1*  7/2003   Andou et al. ............... 277/628
2003/0143451 A1*  7/2003   Andou et al. ............... 429/34

FOREIGN PATENT DOCUMENTS

| EP | 1 302 996 A2 | 4/2003 |
| JP | 11-233128 A | 8/1999 |
| JP | 2002-141082 A | 5/2002 |
| JP | 2004039341 A * | 2/2004 |

* cited by examiner

*Primary Examiner*—Gregg Cantelmo
(74) *Attorney, Agent, or Firm*—Panitch Schwarze Belisario & Nadel LLP

(57) ABSTRACT

A polymer electrolyte fuel cell comprises an electrolyte membrane-electrode assembly, a pair of conductive separator plates sandwiching the electrolyte membrane of the electrolyte membrane-electrode assembly, and a pair of sealing means sealing between the electrodes of the electrolyte membrane-electrode assembly and the separator plates. The pair of sealing means is constituted by combination of a flat sealing member having a flat portion in flat contact with the electrolyte membrane and of a linear sealing member having a rib in linear contact with the electrolyte membrane, and at least part of the rib is in the form of falling in the direction to the electrode when the electrolyte membrane, the pair of electrodes and the pair of separator plates are stacked to be cramped. This makes it possible for the fuel cell to have an excellent sealing property and a stable output characteristic.

12 Claims, 12 Drawing Sheets

(a)

(b)

(a)

(b)

(a)

(b)

POLYMER ELECTROLYTE FUEL CELL

BACKGROUND ART

The present invention relates to a polymer electrolyte fuel cell for use in portable power sources, power sources for portable devices, power sources for electric vehicles, domestic cogeneration systems and the like.

A fuel cell using a polymer electrolyte membrane electrochemically reacts a fuel gas containing hydrogen with an oxidant gas containing oxygen, such as air, to simultaneously generate electric power and heat. This fuel cell comprises a polymer electrolyte membrane for selectively transporting hydrogen ions, and a pair of electrodes, i.e. an anode and a cathode, formed respectively on both faces of the polymer electrolyte membrane. This is called an electrolyte membrane-electrode assembly (MEA). The electrode comprises: a catalyst layer mainly composed of a carbon powder carrying a platinum group metal catalyst and formed on each face of the polymer electrolyte membrane; and a gas diffusion layer formed on the outer surface of the catalyst layer and having both permeability and electronic conductivity.

In order to prevent a fuel gas and an oxidant gas (reactive gases) to be supplied from leaking out or prevent these two kinds of reactive gases from being mixed with each other, sealing members, such as gaskets, are disposed on the peripheries of the electrodes, with the polymer electrolyte membrane sandwiched therebetween. The sealing members are previously assembled integrally with the electrodes and the polymer electrolyte membrane, and this is called an electrolyte membrane-electrode-sealing member assembly (MESA).

Conductive separator plates are disposed on the outer sides of the MEA for mechanically fixing it and for electrically connecting adjacent MEA's with each other in series. Each of the separator plates has a gas flow channel for supplying reactive gases to the electrode and for carrying away a generated gas and an excessive gas. Although the gas flow channel may be provided separately from the separator plate, a general manner is to provide grooves on the surface of the separator plate to serve as a gas flow channel.

In order to supply reactive gases to these grooves, it is necessary to branch pipes for supplying reactive gases, according to the number of separator plates to be used, and to use jigs for connecting the end of each branch directly to the grooves on the separator plate. This jig is called a manifold, and a type of manifold that directly connects the pipes for supplying reactive gases to the grooves as mentioned above is called an external manifold. A type of manifold with a simpler structure than the external manifold is called an internal manifold. The internal manifold is configured such that through holes are formed in the separator plates having gas flow channels and the inlets and outlets of the gas flow channels are extended to these holes so as to supply reactive gases directly from the holes.

Since a fuel cell generates heat during operation, it is necessary to cool the cell with cooling water or the like in order to keep the cell in good temperature conditions. Normally, a cooling water flow channel is provided for every 1 to 3 unit cells. It is often the case that a cooling water flow channel is provided on the rear surface of the separator plate to serve as a cooling portion. These MEA's and the separator plates are placed one upon another to form a stack of 10 to 200 unit cells, and this stack is sandwiched by end plates, with a current collector plate and an insulating plate between the stack and each end plate, and then fixed with clamping bolts from both ends of the stack. In this manner, a polymer electrolyte fuel cell having a typical structure can be obtained.

A sealing member to be used in such a polymer electrolyte fuel cell as described above is required to have high dimensional accuracy, sufficient elasticity and sufficient fitting margin in order to seal reactive gases, while bringing the separator plate into contact with the electrode. As a typical sealing material, therefore, a seat-shaped gasket comprising a resin, rubber or the like, or an O-ring-shaped gasket comprising rubber, has been used.

Recently, for example, an attempt has been made to reduce load needed for sealing with gaskets for the purpose of simplifying constituent members and reducing the weight and cost thereof by reducing load for clamping a stack, as disclosed in Japanese Laid-Open Patent Publication No. Hei 11-233128 and Japanese Laid-Open Patent Publication No. 2002-141082. Further, another attempt has been made to make a cross section of a gasket triangular, semicircular or the like, instead of making it O-ring-shaped.

In the case of using a gasket having an O-ring-shaped cross section and a certain degree of cross sectional area, it has been attempted that the gasket is disposed on the separator-plate side. However, such a gasket has a problem of being inappropriate for reliably securing a sealing property since a large number of unit cells are stacked to be clamped in a stack.

When an O-ring-shaped gasket is used, sealing is conducted by clamping an electrolyte membrane onto separator plates with the gaskets. Therefore, sealing needs to be conducted in two locations: between an anode (fuel electrode) and the electrolyte membrane; and between a cathode (oxidant electrode) and the electrolyte membrane, and that is to say, both a gasket for sealing a fuel gas and a gasket for sealing an oxidant gas are required, raising a problem of enlarging portions needed to be sealed.

It is further necessary to provide grooves, into which the O-ring-shaped gaskets are placed, on the surface of the separator plate, thereby setting restrictions, such as a restriction on reduction in thickness of the separator plate in order to secure the groove dimension. This has brought about an increase in stack volume, an increase in cost, and complication of the form of the separator plate, causing a decreased yield in processing the separator plate. With the aim of solving these problems, it has been attempted to conduct sealing in a smaller space.

In building a stack, an MESA or MEA is disposed on the separator plate, and on this MEA, the separator plate, or the O-ring-shaped gasket and the separator plate, are disposed. This process is repeated to obtain a stack. In such disposition of the O-ring-shaped gasket or the separator plate on the MEA, a guide is used as a typical jib for assembly. However, since there are dimensional deviations among the respective members, and from the viewpoint of facilitating stacking of the electrodes and the O-ring-shaped gaskets or the separator plates, a clearance is needed between the O-ring-shaped gasket and the electrode. This clearance is aimed at securing good operability or production yield.

When this clearance is small, it tends to be difficult to reliably build a stack. For example, the O-ring-shaped gasket may be partially placed or stacked on the electrode to cause poor sealing. Further, with the O-ring-shaped gasket brought into contact with the electrode, excessive surface pressure is applied onto the electrode, which may result in damage of the electrolyte membrane or deterioration in durability, whereby cell performance may be degraded.

In the case where the clearance between the O-ring-shaped gasket and the electrode is made smaller, therefore, a yield may decrease and cost for components may increase unless dimensional accuracy of each component is improved. Especially when a molded separator plate is used, it is difficult to reduce the clearance between the O-ring-shaped gasket and the electrode since there is a limit to process accuracy of a guide to be used in building a stack, or the like. For this reason, after production of the separator plate by molding, a guiding portion has been added in a post-process, and this has generated additional cost.

On the other hand, in the case where the clearance between the O-ring-shaped gasket and the electrode is enlarged for the purpose of securing a property of building a stack, a reactive gas may flow into the clearance, and it is thereby possible that the reactive gas may be prevented from flowing in a gas flow channel of the separator plate. Further, when clearances of the respective unit cells vary, attributed to deviations in stacking the MEA's and O-ring-shaped gaskets, pressure losses among the unit cells also vary. Because a reactive gas flows in each unit cell in an amount according to pressure loss of each unit cell, flow rates of the reactive gas vary. This causes variations in cell performance among the unit cells, having harmful effects such as lowering of power generation voltage, deterioration in durability and deterioration in safety during low output power operation. These problems occur more significantly on the fuel-gas side where a utilization rate of a reactive gas is relatively high.

Moreover, when a flat gasket is used, although the volume occupied by the gasket can be reduced, the aforesaid problems regarding building of a stack and a clearance exist as in the case of using the O-ring-shaped gasket. Further, excessive clamping force is required for securing surface pressure needed for sealing. It is therefore difficult to reduce weight and cost of members for clamping a stack, and compact those members.

BRIEF SUMMARY OF THE INVENTION

Accordingly, it is an object of the present invention to provide a polymer electrolyte fuel cell having an excellent sealing property and a stable output characteristic, where unit cells can be highly reliably stacked in building a stack, and a clearance between a sealing member and an electrode can be reduced in clamping the stack.

A fuel cell in accordance with the present invention comprises: an electrolyte membrane; a pair of electrodes disposed respectively on both faces of the electrolyte membrane; a pair of conductive separator plates which sandwich the electrodes and have gas flow channels for supplying reactive gases to the electrodes; and a pair of sealing means which sandwich the electrolyte membrane between a pair of separator plates and maintain hermeticity between a pair of electrodes and a pair of separator plates, wherein the pair of sealing means is constituted by combination of a flat sealing member having a flat portion in flat contact with the electrolyte membrane and of a linear sealing member having a rib in linear contact with the electrolyte membrane, and at least part of the rib falls in the direction to the electrode when the electrolyte membrane, the pair of electrodes and the pair of separator plates are stacked to be clamped.

It is preferable that, in the above fuel cell, the whole of the rib falls in the direction to the electrode when the electrolyte membrane, the pair of electrodes and the pair of separator plates are stacked to be clamped.

It is preferable that the rib is curved to the electrode side, and the rib is warped and bent to the side of a pair of electrodes when the electrolyte membrane, the pair of electrodes and the pair of separator plates are stacked to be clamped.

It is preferable that the rib tilts to the electrode side, and the rib falls to the electrode side when the electrolyte membrane, the pair of electrodes and the pair of separator plates are stacked to be clamped.

It is preferable that the rib has a circular portion at the top thereof in contact with the electrolyte membrane in the cross section in the stacking direction, and the diameter of the circular portion is substantially not less than half of the thickness of the electrode.

It is preferable that the rib is linear in the cross section in the stacking direction.

It is preferable that the rib is convex to the electrode side and is concave to the opposite side of the electrode in the cross section in the stacking direction, and part of the rib protrudes to the side of the pair of electrodes when the electrolyte membrane, the pair of electrodes and the pair of separator plates are stacked to be clamped.

It is preferable that the pair of sealing means has an adhesive layer.

It is preferable that the adhesive layer has acid resistance.

According to the present invention, it is possible to secure a sealing property, suppress degradation of cell performance, facilitate building of a stack, compact constituent members of a stack by reducing clamping force, and reduce thickness of a separator plate by decreasing spaces necessary for sealing. Further, a dimension of a guiding portion disposed on the separator plate can be made rough, enabling elimination of the need for processing the guiding portion after molding of the separator plate. This allows improvement in reliability of a fuel cell to be obtained, improvement in yield in mass production, compaction of the cell, and significant cost reduction.

DETAILED DESCRIPTION OF THE INVENTION

Figure 1:
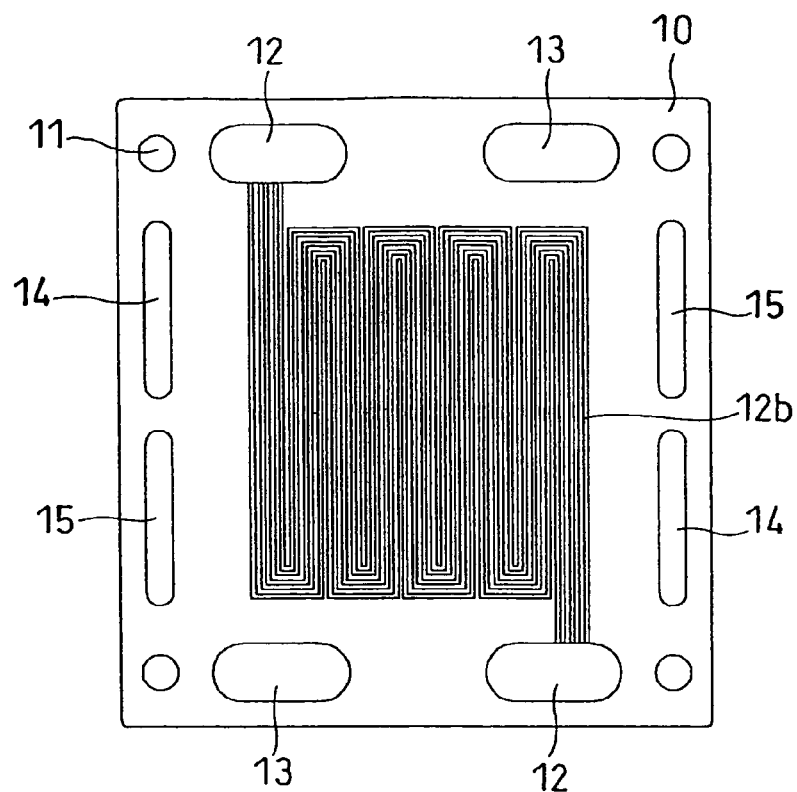
FIG. 1 is a front view of an anode-side separator plate of the present invention.

The fuel cell in accordance with the present invention is characterized in that a pair of sealing means is comprised of a flat sealing member and a linear sealing member.

The flat sealing member is mainly composed of the flat portion substantially parallel to the face direction of the separator plate. Further, the linear sealing member is mainly composed of a rib (lip-shaped portion) extended in the direction crossing the face direction of the separator plate, and the linear sealing portion at the top of the rib is substantially brought into linear contact with the flat sealing member side to conduct sealing.

The rib is characterized by having such a form as to fall to the electrode side when the linear sealing member is clamped. Therefore, when a pair of sealing means, separator plates and electrodes are stacked and clamped to fabricate a fuel cell, the rib is substantially sandwiched between the separator plate and the electrolyte member to be clamped. At this time, the rib falls to the electrode side to exert a sealing property, and when the clamping is completed, the rib having been pressed down to the electrode side has filled a space (clearance) between the linear sealing member and the electrode. When the respective members are stacked and the clamping has not yet begun, the clearance is secured to prevent the members, i.e. the separator plate, the sealing member and the electrode, from interfering with each other, and hence defect of assembly, such as poor sealing, induced by interference of the respective members does not occur.

That is, the linear sealing member of the present invention has such a form as to secure a sufficient clearance between the linear sealing portion and the electrode before being sandwiched between the electrode and the separator plate; after the linear sealing member is sandwiched between the electrode and the separator plate and then clamped, at least part of the rib of the linear sealing member, with a sealing clamping margin, falls to the electrode side and enters the space between the linear sealing member and the electrode to reduce the clearance.

By using such a pair of sealing members as described above, it is possible to obtain a stable sealing property, enabling reduction in space necessary for the sealing as well as reduction in load for clamping a stack. Further, in building a stack, it is particularly possible to secure a sufficient clearance between the linear sealing member and the electrode; in clamping the stack, it is possible to make the clearance smaller than in stacking by bending and falling of the rib of the linear sealing member to the electrode side. This permits suppression of flowing-out of a reactive gas into the clearance so that a stable power generation property can be obtained.

Namely, according to the present invention, it is possible to secure the sealing property by securement of a highly reliable stacking property, suppress flowing-out of a reactive gas into the clearance by reducing the clearance, and improve cell performance associated with those. Moreover, it is possible to eliminate a post-process of the separator plate due to decreased accuracy of the guiding portion necessary for the separator plate in building a stack, improve yield in production, reduce cost associated with those, decrease the volume of the cell stack by reducing a space occupied by the sealing member, reduce weight by decreasing the clamping force of the stack, compact the cell stack, and lower cost thereof.

Further, it is preferable that, in the linear sealing member, the rib including the linear sealing portion is convex to the electrode side and is concave to the opposite side of the electrode in the cross section in the stacking direction. In this case, when load for clamping a stack is applied to the rib from the stacking direction in clamping due to the aforesaid cross sectional form of the rib, the rib is warped and bent to the electrode side while being brought into linear contact with the electrolyte membrane. Namely, the linear sealing member is clamped in the stack while the rib is bent in convex form.

Therefore, due to the reactive force to the separator plate and the electrolyte membrane based on elasticity of the linear sealing member, the sealing property is secured. Further, even when the clearance between the linear sealing member and the electrode is sufficiently secured, the space between the linear sealing member and the electrode can be reduced by protrusion of the warped rib in the direction to the electrode. With the space reduced, a fuel gas or an oxidant gas having flown through the space without being reacted at the electrode can be flown in the flow channels in the separator plate where the gases normally flow.

In this manner, the same effects as described above can be obtained. Namely, it is possible to secure the sealing property by securing a highly reliable stacking property, reduce flowing-out of a reactive gas into the clearance by reducing the clearance, and improve cell performance associated with those. Moreover, it is possible to eliminate a post-process of the separator plate due to decreased accuracy of the guiding portion necessary for the separator plate in building a stack, improve yield in production, reduce cost associated with those, decrease the volume of the cell stack by reducing a space occupied by the sealing member, reduce weight by decreasing the clamping force of the stack, compact the cell stack, and lower cost thereof.

Further, it is preferable that the rib on the linear sealing member, which falls to the electrode side in clamping, has a circular portion at the top thereof in the cross section in the stacking direction, and the diameter of the circular portion be substantially not less than half of the thickness of the electrode. It should be noted that the top of the rib corresponds to the linear sealing portion in linear contact with the electrolyte membrane.

This causes an increase in reactive force of the linear sealing member against the separator plate or the electrolyte membrane in clamping the stack, enabling securement of a further stable sealing property. That is to say, when the stack is clamped by sandwiching the linear sealing member between the separator plate and the electrolyte membrane, the rib is bent, tilts, or falls to the electrode side to fill the space, and the circular portion at the top of the rib is sandwiched between the separator plate and the electrolyte membrane to be compressed. At that time, since the circular portion has a diameter not less than half of the electrode thickness, even larger reactive force is exhibited when the circular portion is compressed in a prescribed amount. It is therefore possible to improve the sealing property and obtain more stable sealing.

The material constituting the flat sealing member and the linear sealing member may be exemplified by fluorine rubber, polyisoburane, butyl rubber, ethylene propylene rubber, silicone rubber, nitrile rubber, thermoplastic elastomer, liquid crystal polymer, a polyimide resin, a polyether etherketone resin, a polyether imide resin, a polyphenylene sulfide resin, a terephthalamide resin, a polyether sulfone resin, polysulfone resin, a syndiotactic polystyrene resin, a polymethylpentene resin, a denatured polyphenylene ether resin, a polyacetal resin, a polypropylene resin, a fluorocarbon resin, and a polyethylene terephthalate resin. These can be used singly or in combination of two or more of them.

It is preferable that the flat sealing member and the linear sealing member have an adhesive layer on the portion in contact with the electrolyte membrane and/or the portion in contact with the separator plate.

For example, the top (the linear sealing portion) of the rib on the aforesaid linear sealing member secures the sealing property by being press-attached to electrolyte membrane. Herein, the formation of the adhesive layer at the top of the rib in contact with the electrolyte membrane allows obtainment of the stable sealing property due to the adhesive force of the adhesive layer even when the reactive force of the sealing member itself is weak.

The material constituting the adhesive layer may be exemplified by a copolymer of styrene and ethylene butylene, polyisobutylene, ethylene propylene rubber, and butyl rubber. These can be used singly or in combination of two or more of them.

Further, for securing the sealing property of the sealing member for a long period of time, it is preferable that the adhesive layer has acid resistance. For example, when the electrolyte membrane having hydrogen ion conductivity is used, the portion of the electrolyte membrane, which is in contact with the adhesive layer, takes on acidity while exhibiting ion conductivity. In order for the portion of the adhesive layer, which is in contact with the electrolyte membrane, to obtain a stable sealing property for a long period of time, the adhesive layer desirably has acid resistance.

In the following, embodiments of the present invention will be described with reference to drawings:

EMBODIMENT 1

Figure 2:
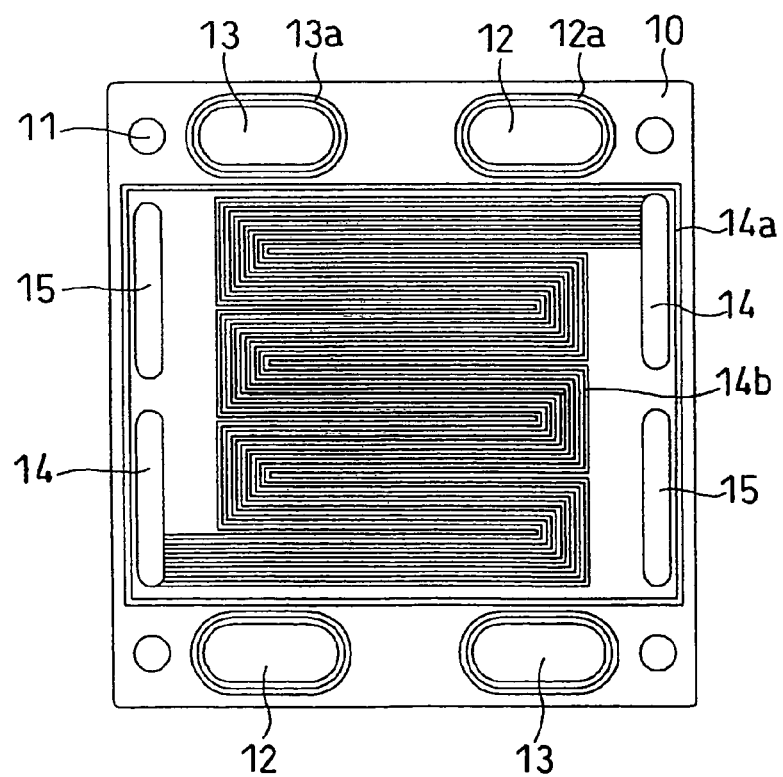
FIG. 2 is a rear view of the anode-side separator plate of the present invention.

FIG. 1 shows a front view of an anode-side separator plate, and FIG. 2 shows a rear view thereof.

An anode-side separator plate 10 having conductivity comprises a pair of fuel gas manifold apertures 12, a pair of oxidant gas manifold apertures 13, a pair of cooling water manifold apertures 14, a pair of spare manifold apertures 15, and four bolt holes 11 for clamping.

On the face of the anode-side separator plate 10, which is opposed to an anode, a gas flow channel 12b is disposed for supplying a fuel gas, communicated by the pair of fuel gas manifold apertures 12, to the anode. The gas flow channel 12b is comprised of four grooves.

On the back surface of the separator plate 10, a cooling water flow channel 14b for communicating the pair of cooling water manifold apertures 14 is disposed. The flow channel 14b is comprised of six grooves arranged in parallel. O-ring grooves 12a and 13a for installing O-rings are disposed so as to respectively surround the peripheries of the pair of fuel gas manifold apertures 12 and the peripheries of the pair of oxidant gas manifold apertures 13. Further, the cooling water manifold apertures 14, the spare manifold apertures 15, and an O-ring groove 14a surrounding the periphery of the cooling water flow channel 14b are disposed.

Figure 3:
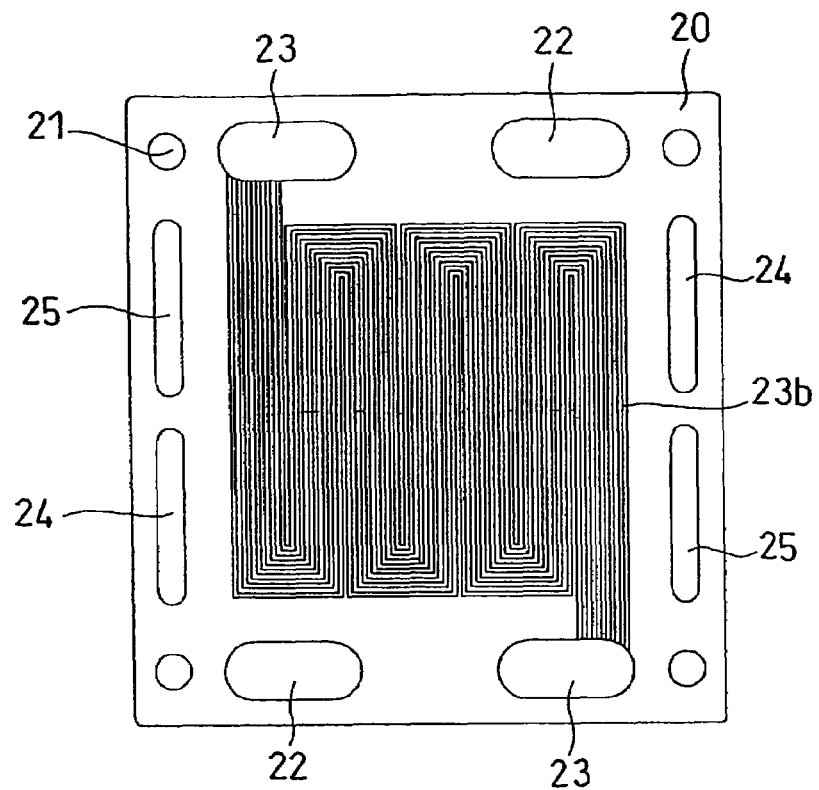
FIG. 3 is a front view of a cathode-side separator plate of the present invention.
Figure 4:
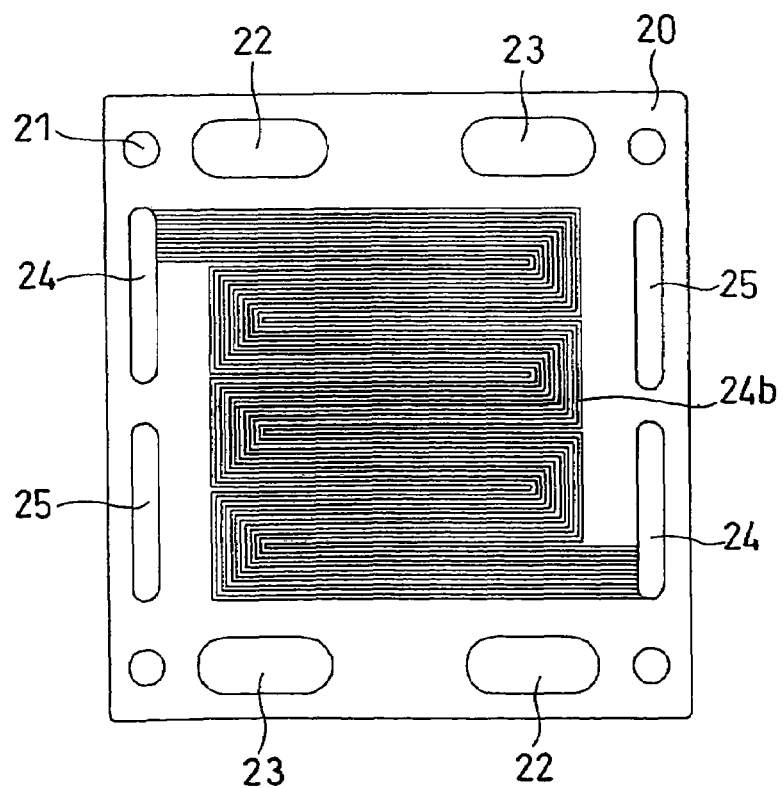
FIG. 4 is a rear view of the cathode-side separator plate of the present invention.

FIG. 3 shows a front view of a cathode-side separator plate and FIG. 4 shows a rear view thereof.

A cathode-side separator plate 20 having conductivity comprises a pair of fuel gas manifold apertures 22, a pair of oxidant gas manifold apertures 23, a pair of cooling water manifold apertures 24, a pair of spare manifold apertures 25, and four bolt holes 21 for clamping.

On the face of the cathode-side separator plate 20, which is opposed to a cathode, a gas flow channel 23b is disposed, for supplying an oxidant gas, communicated by the pair of fuel gas manifold apertures 23, to the cathode. The gas flow channel 23b is comprised of seven grooves.

On the back surface of the separator plate 20, a cooling water flow channel 24b for communicating the pair of cooling water manifold apertures 24 is disposed. The flow channel 24b is comprised of six grooves arranged in parallel.

Figure 5:
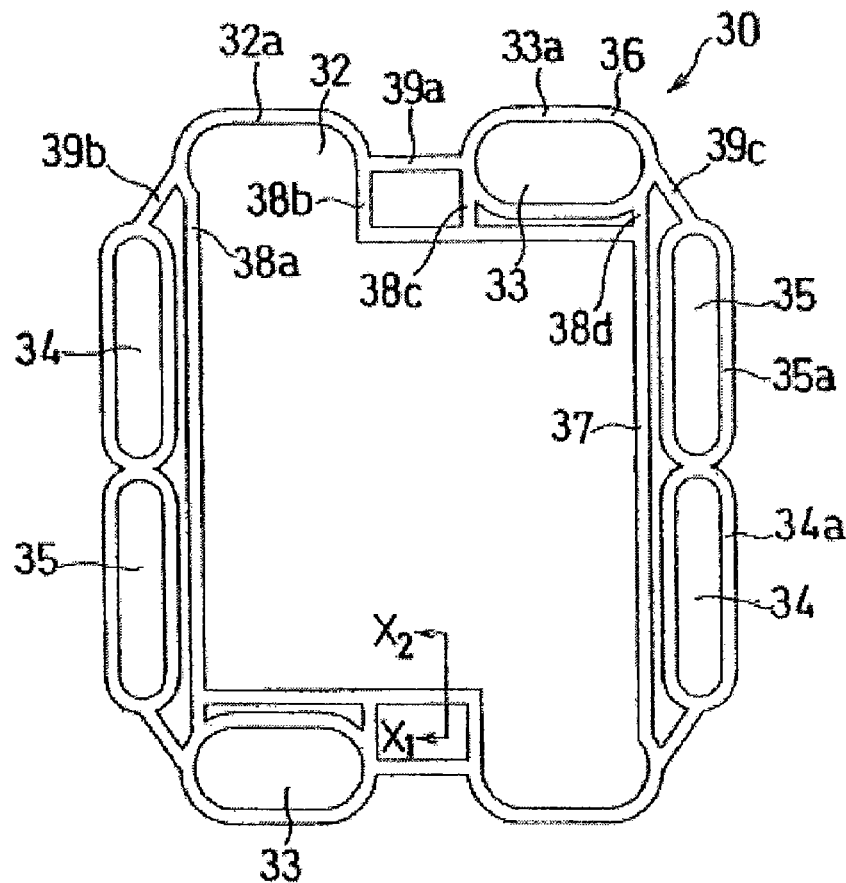
FIG. 5 is a front view of an anode-side sealing member in Embodiment 1 of the present invention.
Figure 6:
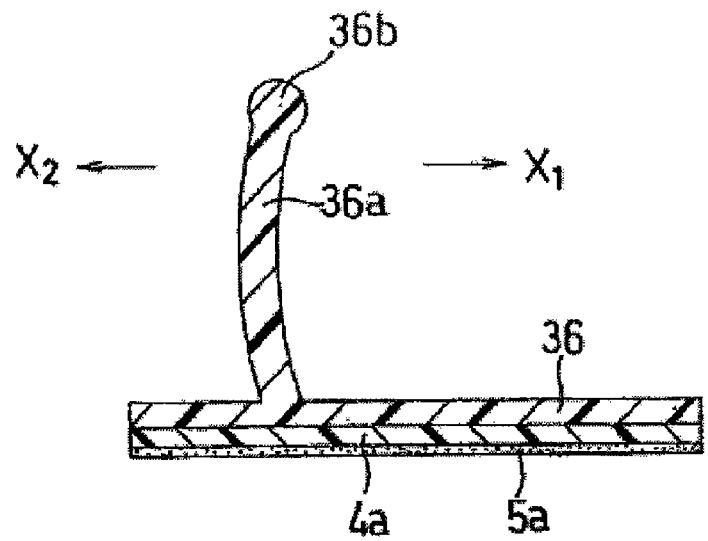
FIG. 6 is a cross-sectional view cut along the line $X_1$-$X_2$ of FIG. 5.
Figure 7:
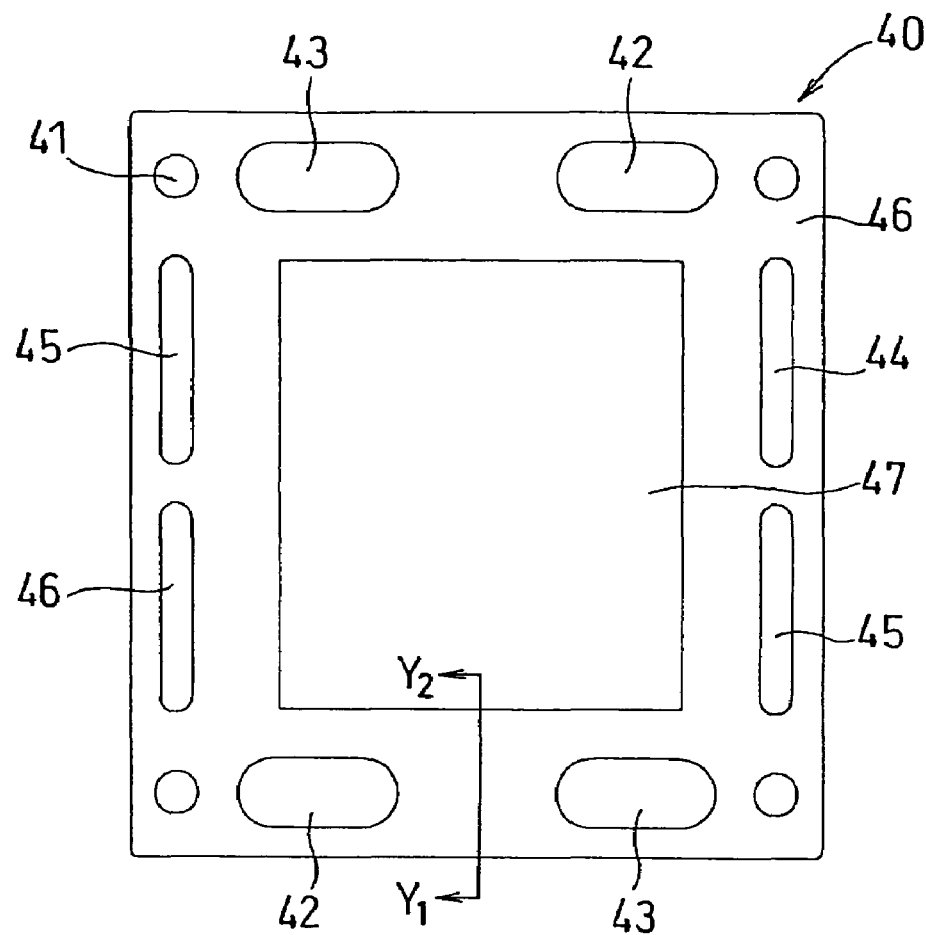
FIG. 7 is a front view of a cathode-side sealing member in Embodiment 1 of the present invention.
Figure 8:
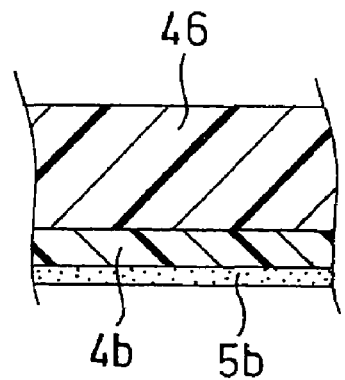
FIG. 8 is a cross-sectional view cut along the line $Y_1$-$Y_2$ of FIG. 7.

Herein, FIG. 5 shows a front view of a linear sealing member to be used as the anode-side sealing member; FIG. 6 shows a cross-sectional view cut along the line $X_1$-$X_2$ of FIG. 5. FIG. 7 shows a front view of a flat sealing member to be used as the cathode-side sealing member; and FIG. 8 shows a cross-sectional view cut along the line $Y_1$-$Y_2$ of FIG. 7. The combination of the linear sealing member and the flat sealing member constitutes the pair of sealing means, which is the primary characteristic of the present invention. It is to be noted that the cross section cut along the line $X_1$-$X_2$ and the cross section cut along the line $Y_1$-$Y_2$ are cross sections in the stacking direction of a fuel cell.

As shown in FIG. 6, a linear sealing member 30 to adhere onto the anode-side separator plate 10 comprises a film 4a comprising polyimide, a linear base sealing member 36 having a rib (lip-shaped portion) 36a formed on one face of the film 4a, and an adhesive layer 5a formed on the other face of the film 4a to adhere to the anode-side separator plate 10.

The rib 36a has a substantially circular top 36b in linear contact with the polymer electrolyte membrane, and is disposed along the base sealing member 36. The rib 36a is linear and curved to the electrode side in the press-bonding (stacking) direction of a cell stack. The top 36b is in linear contact with a later-described cathode-side flat sealing member, via the electrolyte membrane. Further, the diameter of the circle of the top 36b is 1 mm, which is larger than the electrode thickness.

As shown in FIG. 5, the linear sealing member 30 comprises: a first anode-side sealing member constituting one closed loop by surrounding the gas flow channel 12b and the peripheries of a pair of fuel gas manifold apertures 12 on the anode-side separator plate; and manifold aperture sealing portions 33a, 34a and 35a which are respectively surrounding the peripheries of the oxidant gas manifold aperture 13, the cooling water manifold aperture 14 and the spare manifold aperture 15. Further, the base sealing member 36 comprises sealing portions 38c and 38d which are surrounding both sides of the communication gas flow channel 23b on the cathode-side separator plate 20.

The linear sealing member 30 communicates an electrode sealing portion 37 surrounding the anode, a manifold aperture sealing portion 32a surrounding the half of the external side of the fuel gas manifold aperture 32, the electrode sealing portion 37 and the manifold aperture sealing portion 32a, and comprises sealing portions 38a and 38b surrounding both sides of the gas flowing channel 12b.

Further, the linear sealing member 30 comprises a sealing portion 39a for connecting the fuel gas manifold aperture sealing portion 32a and the oxidant gas manifold aperture sealing portion 33a, a sealing portion 39b for connecting the fuel gas manifold sealing portion 32a and the cooling water manifold aperture sealing portion 34a, a sealing portion 39c for connecting the oxidant gas manifold aperture sealing portion 33a and the spare manifold aperture sealing portion 35a, and a sealing portion 39d for connecting the cooling water manifold aperture sealing portion 34a and the spare manifold aperture sealing portion 35a.

The film 4a and the adhesive layer 5a have the same form as that of the base sealing member 36, and the adhesive layer 5a and the base sealing member 36 were placed on the film 4a to form the anode-side linear sealing member 30.

On the other hand, as shown in FIG. 8, a cathode-side flat sealing member 40 to adhere to the cathode-side separator plate 20 comprises a film 4b comprising polyimide, a flat base sealing member 46 formed on one face of the film 4b, and an adhesive layer 5b formed on the other face of the film 4b.

The film 4b and the adhesive layer 5b comprise: a fuel gas manifold aperture 42, an oxidant gas manifold aperture 43, a cooling water manifold aperture 44, a spare manifold aperture 45, which respectively correspond to the manifold apertures in the cathode-side separator plate 20; and bolt holes 41, and a portion 47 which corresponds to the cathode (electrode installed portion) has been cut away.

The cathode-side base sealing member 46 is in the form of a plain plate, which is the same form as those of the film 4b and the adhesive 5b.

By adhering the adhesive-layer-5a-side face of the anode-side linear sealing member 30 to the anode-opposing-side face of the anode-side separator plate 10, the anode-side base sealing member 36 is fixed to the anode-side separator plate 10.

On the other hand, by adhering the adhesive-layer-5b-side face of the cathode-side flat sealing member 40 to the cathode-opposing-side face of the cathode-side separator plate 20, the cathode-side base sealing member 46 is fixed to the cathode-side separator plate 20.

Subsequently, the cathode-side flat sealing member 40 and the anode-side linear sealing member 30 are sandwiched between the above separator plates via the electrolyte membrane to be press-attached for sealing.

An MEA comprising a pair of electrodes and the electrolyte membrane is sandwiched between the anode-side separator plate 10 having the anode-side linear sealing member 30 and the cathode-side separator plate 20 having the cathode-side flat sealing member 40 to constitute a unit cell. In this case, each electrode has an area smaller than that of the electrolyte membrane, and each electrode is positioned at the center of the electrolyte membrane. Therefore, the electrolyte membrane is in the state of being exposed to the periphery of the MEA. This exposed portion is sandwiched between the linear sealing member 30 and the flat sealing member 40.

Generally, a prescribed jig for assembly with a guide pin standing thereon is used to assembly a unit cell. The following is one example of procedures for such assembly.

First, the cathode-side separator plate 20 having the cathode-side flat sealing member 40 is disposed on the assembly jig. The MEA is then disposed on the cathode-side separator plate 20 along with the guide pin. Further, the anode-side separator plate 10 having the anode-side linear sealing member 30 is disposed on the MEA.

In the case of assembling a unit cell in the aforesaid procedure, when the anode-side separator plate 10 is placed, the positional relationship between the MEA and the anode-side linear sealing member 30 cannot be visually confirmed. Hence the anode-side linear sealing member 30 is occasionally out of position slightly. However, the use of the anode-side linear sealing member 30 of the present embodiment allows formation of a sufficient clearance between the MEA and the electrode sealing portion 37 on the anode-side linear sealing member 30 in assembling a unit cell. This can prevent the anode-side linear sealing member 30 from being partially placed or stacked on the MEA, enabling securement of a stable sealing property.

In the case of stacking a plurality of unit cells to constitute a stack, when the stack is clamped, a rib 36a in the form of being curved to the electrode side on the anode-side linear sealing member 30 is bent to the anode side of the MEA, reducing the clearance between the electrode sealing portion 37 surrounding the anode and the anode of the MEA. Therefore, in using the stack, an amount of a reactive gas flown out into the clearance can be reduced to obtain stable power generation performance.

It is to be noted that, as for the anode-side linear sealing member 30 having the aforesaid configuration, the anode and the oxidant gas manifold aperture 33 are isolated by means of the manifold aperture sealing portion 33a and the electrode sealing portion 37, respectively. The anode and the manifold aperture 33 may be isolated only by means of the manifold aperture sealing portion 33a or the electrode sealing portion 37.

Further, the cathode-side flat sealing member 40 with the aforesaid configuration has the form of covering the whole principal surface of the cathode-side separator plate 20 except for the portions corresponding to the cathode and each manifold aperture.

It is to be noted that there are portions in the aforesaid linear sealing member and flat sealing member, which do not correspond to each other in clamping the stack. For example, in the linear sealing member 30 shown in FIG. 5, the manifold aperture sealing member 32a surrounds about half of the fuel gas manifold aperture 32, and hence a sealing member does not exist between the fuel gas manifold aperture 32 and the anode. In this portion without the existence of the sealing member, the linear sealing member does not correspond to the flat sealing member. However, when the stack is constituted, the sealing member having elasticity is pressed by the pair of separator plates with appropriate pressure; one of the aforesaid linear and flat sealing members is brought into direct contact with the separator plate to conduct sealing, even when the two sealing members do not correspond to each other.

Moreover, a member such as a cover plate may be provided in the aforesaid portion with the sealing member nonexistent, and this member may be corresponded to the flat sealing member to conduct sealing. For example, in a position corresponding to the cathode-side flat sealing member 40 between the sealing portions 38a and 38b in FIG. 5, the cover plate covering over the gas flow channel 12b may be provided.

Figure 11:
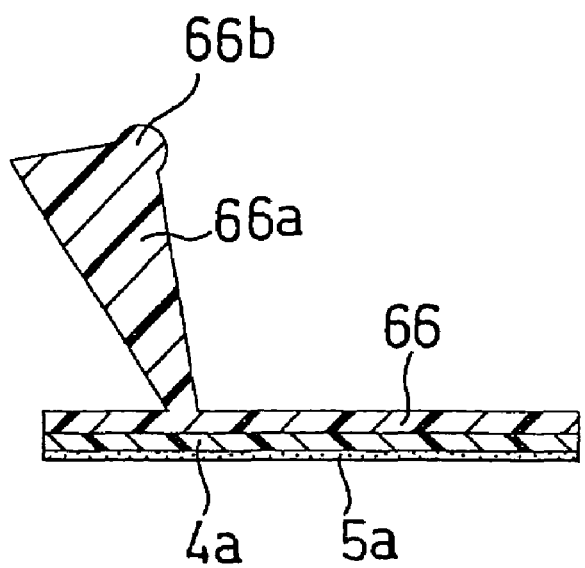
FIG. 11 is a cross-sectional view of another anode-side sealing member in Embodiment 1.
Figure 11:
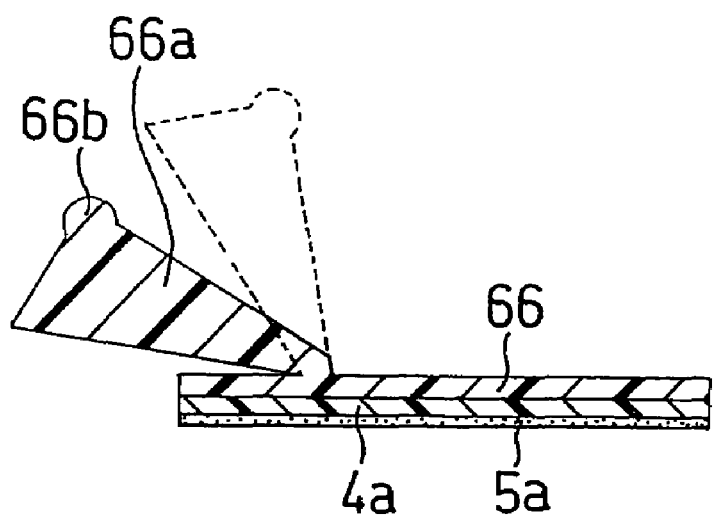
Figure 12:
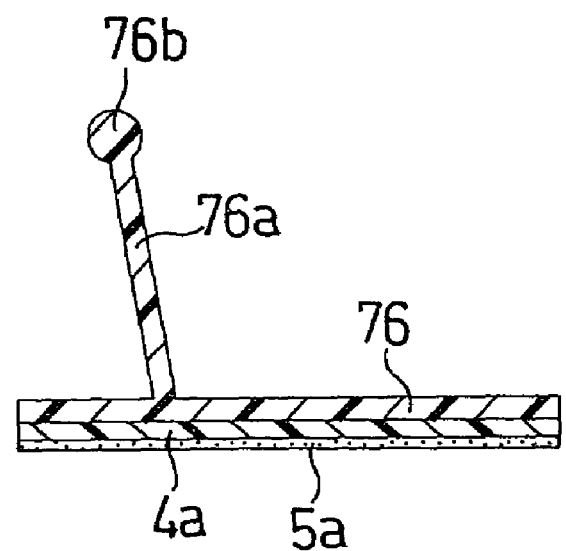
FIG. 12 is a cross-sectional view of still another anode-side sealing member in Embodiment 1.
Figure 12:
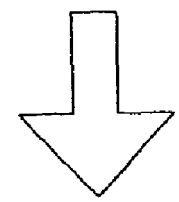
Figure 12:
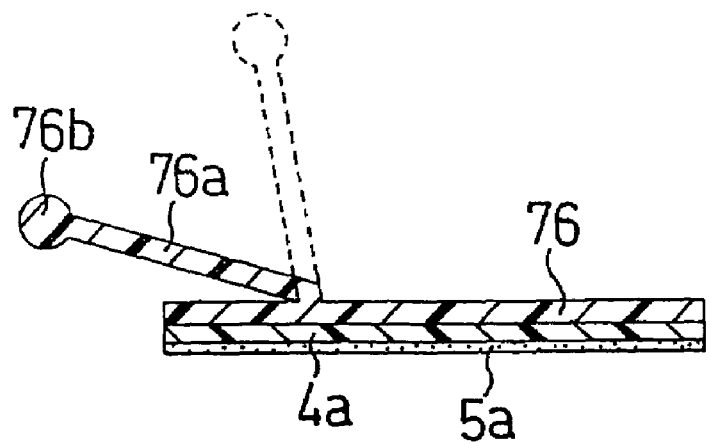

It is to be noted that the cross sectional form of the rib of the linear sealing member 30 on the anode-side separator plate 10 of Embodiment 1 is not limited to the form shown in FIG. 6. As shown in FIGS. 11 and 12, the aforesaid cross sectional form may be like the forms of ribs 66a and 76a respectively having the tops 66b and 76b in linear contact with the electrolyte membrane. These ribs 66a and 76a are configured to tilt to the electrode side to the stacking direction (press-attaching direction) of the stack, and to fall to the electrode side (the left sides of the ribs 66a and 76a) in clamping the stack.

Herein, when a falling-angle (angle between the line (dotted line) indicating the position of the rib before the falling, shown on the right side, and the line (solid line) indicating the position of the rib after the falling) of each of the ribs 66a 76a after the clamping is referred to as θ, and the length of each of the ribs 66a and 76a is referred to L, it is possible to reduce the clearance between the electrode and sealing member by an area of L sin θ.

Moreover, because the top 36b of the rib is substantially circular in the cross section and the diameter thereof is not less than the electrode thickness in the present embodiment, large reactive force is obtained with the sealing member when the stack is clamped, enabling securement of stable sealing property.

It was found that, when the diameter of the circular cross sectional form of the rib top 36b is varied to have a diameter not less than half of the electrode thickness, stable sealing property can easily be obtained. Normally, in the case of press-attaching the electrode by the separator plate, contact resistance between the electrode and the separator plate is reduced, and then clamped with a surface pressure of about 10 kgf/cm² in order to effectively output an obtained cell voltage. At this time, the electrode has been compressed to a thickness almost half of the initial thickness thereof. It was therefore found that, with the diameter of the rib top 36b not less than half of the initial electrode thickness, reactive force becomes large in clamping the stack, so as to improve the sealing property.

Furthermore, when the diameter of the rib top 36b was more than a three-fold of the initial thickness of the electrode, while the stable sealing property was obtained, the output voltage of the cell stack tended to decrease as the contact resistance between the separator plate and the electrode increased. It was therefore found that the diameter of the rib top 36b is favorably less than a three-fold of the initial thickness of the electrode.

EMBODIMENT 2

Figure 9:
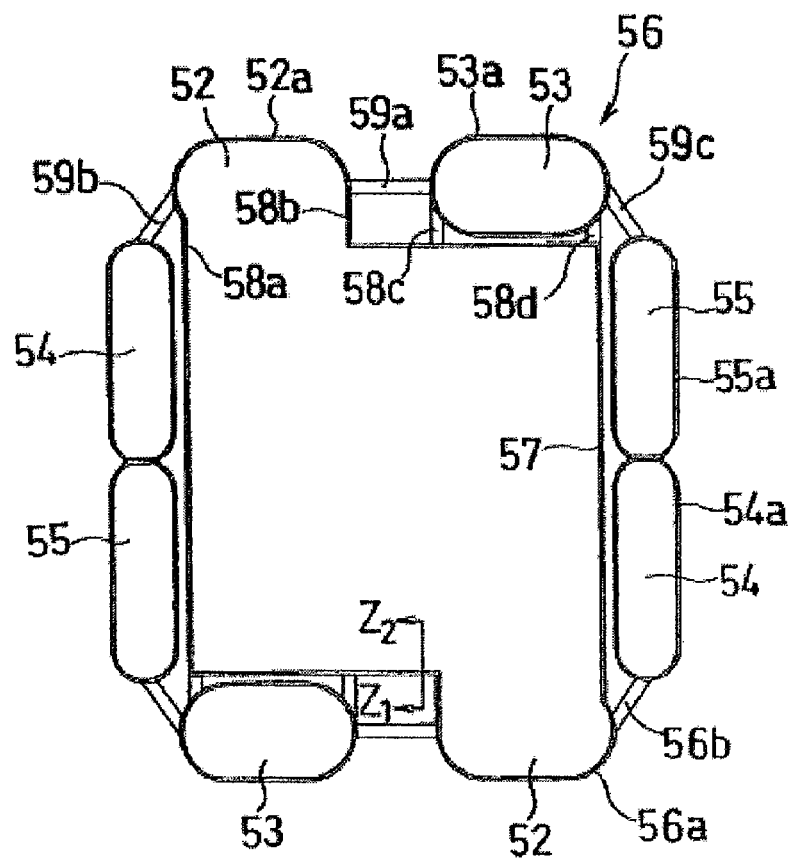
FIG. 9 is a front view of the anode-side sealing member in Embodiment 2 of the present invention.
Figure 10:
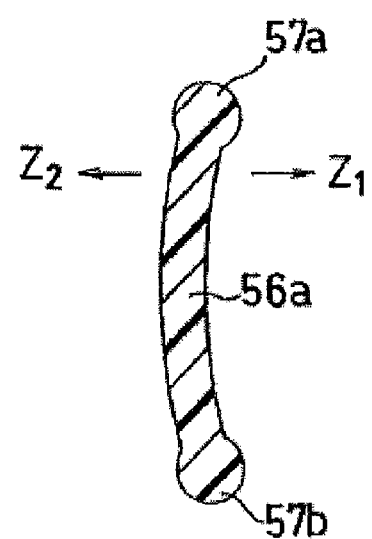
FIG. 10 is a cross-sectional view cut along the line $Z_1$-$Z_2$ of FIG. 9.

Next, FIG. 9 shows a front view of an anode-side linear sealing member in accordance with another embodiment; FIG. 10 shows a cross-sectional view cut along the line $Z_1$-$Z_2$ of FIG. 9.

An anode-side linear sealing member 56 of the present embodiment is comprised of a rib-shaped (lip-shaped) sealing member 56a alone, which corresponds to the rib 36a on the anode-side linear sealing member 30 above described using FIGS. 5 and 6.

On the anode-side linear sealing member 56 of the present embodiment, the rib-shaped sealing member 56a is disposed in the position corresponding to the electrode sealing portion 37 and the manifold aperture sealing portions 33a, 34a and 35a of the sealing member 30, shown in FIG. 5. The rib-shaped sealing member 56a is disposed on the sealing portions 52a, 53a, 54a, 55a, 57, 58a and 58b, shown in FIG. 9.

The rib-shaped sealing member 56a has a form bent to the electrode side in the stacking direction (press-attaching direction) of the stack, and has tops 57a and 57b in linear contact with the separator plate and the electrolyte membrane. In clamping the stack, the rib-shaped sealing member 56a is warped and bent in the direction to the electrode and the top 57a is fixed to the separator plate, while the top 57b is brought into linear contact with a later-described cathode-side flat sealing member via the electrolyte membrane in assembling the cell.

Further, on the anode-side linear sealing member 56 of the present embodiment, sealing members 56b, 58c, 58d, 59a, 59b and 59c in the form of a thin plate are disposed in the positions corresponding to the sealing portions 38c, 38d, 39a, 39b and 39c in the linear sealing member 30 in Embodiment 1 above, and those plate-shaped sealing members are coupled and integrated with the aforesaid respective rib-shaped sealing members.

The use of the further compact anode-side linear sealing member of the present embodiment and the cathode-side sealing member of Embodiment 1 above in combination allows obtainment of the same effect as in Embodiment 1 so that an excellent sealing property can be secured.

Figure 13:
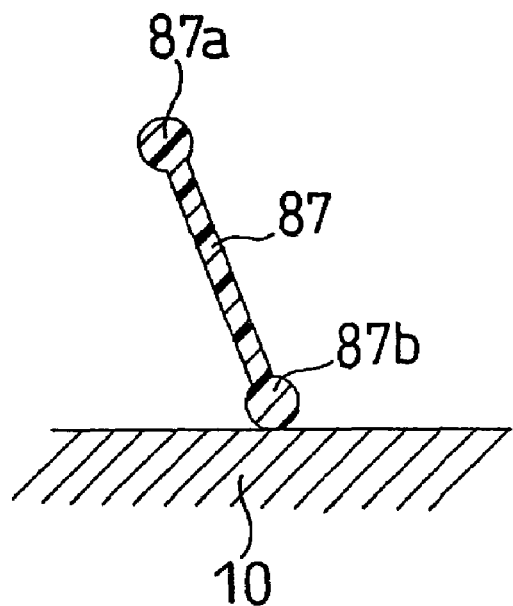
FIG. 13 is a cross-sectional view of another anode-side sealing member in Embodiment 2.
Figure 13:
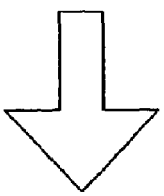
Figure 13:
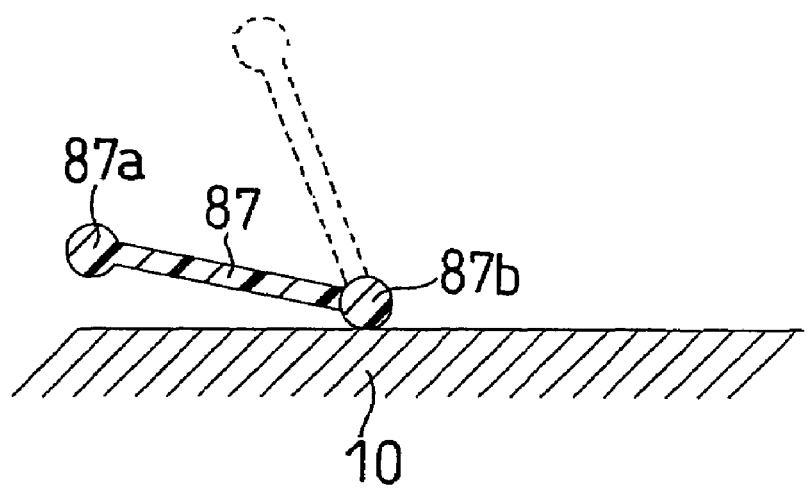

It is to be noted that the rib-shaped sealing member on the anode-side separator plate of Embodiment 2 may have a form like that of a linear rib-shaped sealing member 87 having tops 87a and 87b at both ends thereof, which are respectively in contact with the electrolyte membrane and the anode-side separator plate 10, as shown in FIG. 13.

In this case, the top 87b is fixed to the anode-side separator plate 10 with an adhesive agent, and the top 87a is positioned closer to the electrode side (the left side of the rib-shaped sealing member 87) than the top 87b. Namely, the rib-shaped sealing member 87 tilts to the electrode side on the anode-side separator plate 10. For this reason, in clamping the stack, the rib-shaped sealing member 87 falls to the electrode side with the top 87b serving as a supporting point, thereby enabling reduction in clearance between the electrode and the rib-shaped sealing member.

It should be noted that, for example, a copolymer of styrene and ethylenebutylene can be used as the adhesive agent. A toluene solution including the styrene-ethylenebutylene copolymer is applied to a prescribed position of the sealing member, toluene as the solvent is then removed in a drying furnace set to 50° C. so as to form an adhesive layer on the sealing member. By closely attaching this adhesive layer to the separator plate, the sealing member can be fixed to the separator plate.

Examples of the present invention will be specifically described below.

EXAMPLE 1

(i) Production of Separator Plate

Using an isotopic graphite board, the anode-side separator plate shown in FIGS. 1 and 2 of Embodiment 1 and the cathode-side separator plate 20 shown in FIGS. 3 and 4 were produced by mechanical process. The separator plate had a thickness of 3 mm, and the grooves of the gas flow channels and the cooling water flow channels had a pitch length of 3 mm and a width of 1.5 mm.

(ii) Production of Sealing Member

The linear sealing member 30 and the flat sealing member 40, each having the same adhesive layer as that of Embodiment 1 shown in FIGS. 5 to 8, were produced.

After placing polyimide films 4a and 4b with a thickness of 100 μm on a mold, the mold was clamped and fluorine rubber ("Viton", fluorine rubber, manufactured by E.I. Du Pont de Nemours & Company Inc.) was projection-molded under conditions of a temperature of 200° C. and projection pressure of 150 kgf/cm², to form the prescribed base sealing members 36 and 46 on the polyimide films 4a and 4b. Secondary crosslinking was conducted under conditions of 200° C. and 10 hours. Thereafter, the adhesive layers 5a and 5b comprising butyl rubber and having a thickness of 25 μm were jointed onto the polyimide films 4a and 4b by transfer-printing, and the surfaces of the adhesive layers 5a and 5b were covered with a polypropylene-made mold releasing film.

At this time, the base sealing member 36 comprising fluorine rubber had a thickness of 125 μm and a width of 3 mm. Further, the rib 36a on the electrode sealing member 37 of the base sealing member 36, surrounding the anode, was formed integrally with the base sealing member 36 in injection-molding, to be placed in the position 0.7 mm away from the electrode-side top. Further, the rib 36a was disposed in the vertical direction to the base sealing member 36 at a curvature of a radius of 2.5 mm and an open angle of 35 degrees. The rib 36a except for the electrode sealing portion 37 was disposed at the center of the base sealing member 36 with a width of 3 mm.

On the other hand, the thickness of the base sealing member 46 for the cathode-side flat sealing member 40 was 125 μm. Moreover, the manifold apertures 42 to 44 for a fuel gas, an oxidant gas and cooling water, the spare manifold aperture

45, the bolt holes 41 for clamping, and a portion opposed to the electrode were punched out with a punch.

The above-obtained linear sealing member 30 and flat sealing member 40, having the adhesive layers 5a and 5b, were respectively placed on the separator plates 10 and 20 for press-attaching by hot press. The conditions for the hot press were a temperature of 100° C., a press load of 2000 kgf, and the pressurizing time of 1 minute.

(iii) Production of MEA

A platinum particle with an average particle size of about 30 Å was carried on an acetylene black type carbon powder in a weight ratio of 4:1 to obtain a catalyst power for the electrode. Isopropanol with this catalyst powder dispersed therein and ethyl alcohol with a powder of perfluorocarbon sulfonic acid dispersed therein were mixed to give paste for the electrode. Using this paste for the electrode as a raw material, a catalyst layer was formed by screen printing on one face of a carbon non-woven fabric having a thickness of 250 μm so as to obtain an electrode. After the formation of the catalyst layer, the amounts of platinum and perfluorocarbon sulfonic acid contained in the catalyst layer were 0.5 mg/cm$^2$ and 1.2 mg/cm$^2$, respectively.

The above electrodes were used as an anode and a cathode. Namely, the anode and the cathode were identically constituted. A hydrogen-ion conductive polymer electrolyte membrane (Nafion 117, manufactured by E.I. Du Pont de Nemours & Company Inc.) was sandwiched between a pair of electrodes having an area of 100 cm$^2$, with the printed catalyst facing the inner side, and then hot pressed to produce an electrolyte membrane-electrode assembly (MEA). Perfluorocarbon sulfonic acid was transformed into a thin film with a thickness of 25 μm to be used as the hydrogen-ion conductive polymer electrolyte membrane.

The size of the electrolyte membrane was the same as the size of a later-described separator plate, and apertures were formed in the electrolyte membrane, respectively corresponding to the pair of fuel gas manifold apertures, cooling water manifold apertures and oxidant gas manifold apertures in the separator plate.

(iv) Assembly of Cell Stack

An MEA with an electrode area of 100 cm$^2$ was sandwiched between the anode-side separator plate 10 having the anode-side linear sealing member 30 and the cathode-side separator plate 20 having the cathode-side flat sealing member 40, as above obtained, to constitute a unit cell. Herein, O-rings 3 were placed in the O-ring grooves 12a to 14a on the anode-side separator plate 10. The unit cells were stacked such that the face of the separator plate 10, which had the cooling water flow channel 14b, was opposed to the face of the separator plate 20, which had the cooling water flow channel 24b, to form a cooling portion.

The procedure for assembling the unit cells will be described below.

A prescribed jig for assembly with the guide pin standing thereon was placed, and the cathode-side separator plate 20 having the cathode-side flat sealing member 40 was disposed on the jig. The MEA was then disposed along the guide pin. Herein, the MEA was built on the cathode-side separator plate 20 carefully enough to prevent the cathode of the MEA from being partially placed or stacked on the periphery of the electrode placing portion 47 on the flat sealing member 40. A clearance is needed between the guide pin placed on the jig for assembly and each of these members to be built.

0.25 mm was secured for one side of the clearance between the cathode of the MEA and the cathode-side flat sealing member 40. It was therefore possible to set the clearance between the separator plate 20 and the guide pin to 0.2 mm. It should be noted that, since the dimension of the MEA varies depending on humidity at the time of the assembly, it is necessary to set a large clearance between the guide pin and the MEA. For stably building the MEA, the required clearance between the guide pin and the MEA was 1 mm.

After the placement of the MEA, the anode-side separator plate 10 having the anode-side linear sealing member 30 was built. Herein, a clearance of 0.7 mm was secured between the anode and the electrode sealing portion 37 on the base sealing member 36. Since the separator plate 10 was non-transparent and the building status of the anode-side separator plate 10 on the MEA thus cannot be visually observed, the anode-side separator plate 10 was built along the guide pin.

The above assembly step was repeated to stack 50 unit cells, and the obtained stack was sandwiched by end plates via current collector plates and insulating plates, and then fixed with a clamping load of 600 kgf using clamping bolts so that a fuel cell was fabricated. This fuel cell was referred to as Cell A. After the clamping, the rib 36a of the electrode sealing portion 37 was bent to the anode side, rendering the clearance between the anode and the electrode sealing portion 37 almost non-existent. At this time, the surface pressures of the MEA and the separator plate were confirmed using pressure sensitive paper, and the surface pressure applied to MEA was found to be 10 kgf/cm$^2$. Consequently, the reactive force to the sealing member was 100 kgf, revealing that it was possible to constitute Cell A with sufficiently low clamping force.

Cell A was subjected to checking for gas leakage. An outlet-side manifold aperture was completely closed and a He gas was flown in from an inlet-side manifold aperture with a pressure of 0.5 kgf/cm$^2$, and a flow rate of the gas flown in was measured. There was observed no gas leakage on the air side, the fuel gas side and the cooling water side, whereby it was confirmed that Cell A had no problem with a fluid sealing property.

COMPARATIVE EXAMPLE 1

A cell stack B was fabricated in the same manner as in Example 1 except for the use of a conventional flat gasket in place of the anode-side linear sealing member and the cathode-side flat sealing member used in Example 1. It is to be noted that a silicone-rubber-made sheet with a thickness of 75 μm was applied onto each face of a PET-made sheet with a thickness of 100 μm, and the resultant sheet was used as the flat gasket. Members were built using a jig for assembly in the same manner and procedure as in Example 1. Herein, the clearance between the flat gasket and the electrode was 0.25 mm both on the anode-side and the cathode side.

Cell B was subjected to the checking for gas leakage under the same conditions as in Example 1. Since a clamping load was 4000 kgf and the surface pressure applied to the MEA was 10 kgf/cm$^2$, the stack was clamped at 4000 kgf. As a result, external leakage of the gas, and/or cross-leakage of the gas from the oxidant gas side to the fuel gas side occurred in part of the unit cells to lead to occurrence of poor sealing.

COMPARATIVE EXAMPLE 2

Cell C was fabricated in the same manner as in Comparative Example 1 except that the clearance between the flat gasket and the anode/cathode was 0.5 mm each. Members were built using a jig for assembly in the same manner and procedure as in Example 1.

Cell C was subjected to the checking for gas leakage under the same conditions as in Example 1. Since a clamping load was 4000 kgf and the surface pressure applied to the MEA was 10 kgf/cm$^2$, the stack was clamped at 4000 kgf. As a result, there was observed no gas leakage on the oxidant side, the fuel gas side and the cooling water side, whereby it was confirmed that Cell C had no problem with a fluid sealing property.

After checking gas leakage, Cells A to C of Example 1 and Comparative Examples 1 and 2 were dissembled to confirm the building conditions thereof. In each of these cells, the anode of the MEA had been built slightly off the center of the anode-side linear sealing member; it was however found that in Cells A and C of Example 1 and Comparative Example 2, the portion for sealing the periphery of the electrode was located outside enough to sufficiently secure a sealing property at the time of building the stack. On the other hand, in Cell B of Comparative Example 1, the electrode had been out of position as in Cells A and C, but it was found that the sealing property of Cell B was impaired and the sealing became defective when even part of the electrodes was partially placed or stacked on the gasket.

In assembling the unit cells, the MEA is placed and then the anode-side separator plate is built. It is favorable here that the anode of the MEA be placed at the center of the anode-side linear sealing member; however, displacement may occur due to accumulation of a clearance of the jig for assembly, a dimensional error of the MEA and a dimensional error of the separator plate.

Stable assembly is possible if the building conditions of the anode and the anode-side linear sealing member can be visually observed; however, because the separator plate is non-transparent and thus cannot be visually observed, the anode and the anode-side linear sealing member are built along the guide pin.

Around the upper limit of the displacement assumable in the case of using the conventional flat gasket, the electrode is partially placed or stacked on the gasket and hence the sealing property cannot be secured. When the clearance was made large for the purpose of improving a property of building the stack, the reactive gas flew into the clearance and was not supplied to the electrode, resulting in deterioration in power generation performance.

On the other hand, in the case of using the sealing member of the present invention, even when the electrode was out of position due to dimensional differences, the sealing property can be secured because of a sufficient clearance between the gasket and the electrode. Further, when the stack is clamped at the time of assembling the stack, the rib of the linear sealing member having warped to the anode side was bent so as to protrude to the anode side with the both tops serving as the sporting points. Herein, surface pressure required for the sealing occurs on the sealing member due to reactive force generated out of the rigidity of the sealing member. Further, the bending and protrusion of the sealing member to the electrode side results in a decrease in clearance between the electrode and the sealing member.

Moreover, because the sealing members are ranged in the stacking direction, shearing force or a bending moment will not act to the electrolyte membrane and the separator plate when the stack is clamped. For this reason, stress is not applied to the sealing member itself, the electrolyte membrane, the separator plate and the like, whereby there is no risk of damaging the members.

Cell A of Example 1 and Cell C of Comparative Example 2 were kept at 75° C., and a hydrogen gas humidified and heated so as to have a dew point of 70° C. and an air humidified and heated so as to have a dew point of 60° C. were supplied to the anode side and the cathode side, respectively.

As a result, both cells obtained an open-circuit voltage of 50 V at the time of non-load when electric power was not supplied to the outside. Further, it was confirmed that there were not such defects as cross-leakage of the gas and short-circuit.

Figure 14:
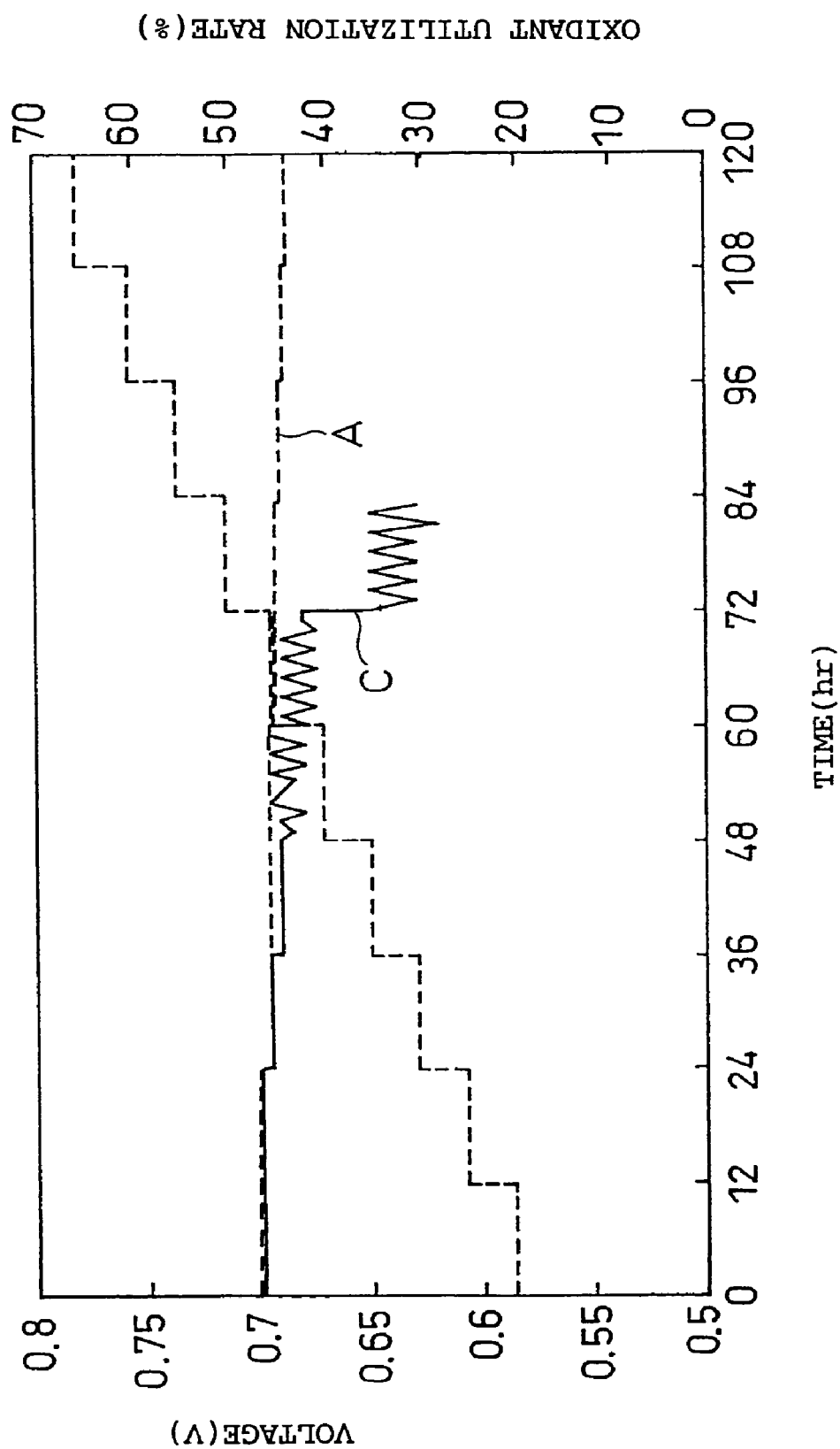
FIG. 14 is a graph showing output characteristics of Cell A of Example 1 and Cell C of Comparative Example 2.

Moreover, power generation was taken place under conditions of a fuel utilization rate of 80%, a current density of 0.3 A/cm$^2$, a dew point on the anode side of 70° C., a dew point on the oxidant gas side of 65° C., and an oxidant utilization rate of 20% which was varied by 5% in every 12 hours. Under these conditions, the stability of the power generation was evaluated. The evaluation results are shown in FIG. 14. In Cell C of Comparative Example 2, the output voltage became unstable when the oxidant utilization rate was not less than 40%, and the output voltage decreased when the oxidant utilization rate was 50%. On the other hand, in Cell A of Example 1, the stable output voltage was obtained until the oxidant utilization rate exceeded 65%.

It was found therefrom that, with the size of the clearance between the electrode and the flat gasket in Cell C of Comparative Example 2, the reactive gas tends to flow into the clearance, and therefore the reactive gas in an amount required for maintaining the cell performance cannot be supplied to the electrode. As opposed to this, when using the sealing member of Example 1, although the clearance between the electrode and the sealing member is large at the time of building the stack, the clearance between the electrode and the sealing member is reduced at the time of clamping the stack. This can prevent the reactive gas from flowing into the clearance and the cell performance from deteriorating.

Further, because the Cell A of Example 1 has clamping force much smaller than those of Cells B and C of Comparative Examples 1 and 2, it is possible in Cell A to simplify or resinify the clamping members for use in the fuel cell, and the like, thereby allowing compaction and cost-reduction of the fuel cell.

It should be noted that, when compared with the case of using the O-ring type gasket, because arrangement of O-ring grooves in the separator plate is not necessary in Example 1, the separator plate can be made thinner by a thickness equal to the depth of the groove, naturally allowing compaction of the fuel cell.

EXAMPLE 2

The same anode-side linear sealing member 56 as that of Embodiment 2, shown in FIGS. 9 and 10, was produced by injection-molding fluorine rubber in a prescribed mold. Herein, the rib-shaped sealing member 56a on the linear sealing member 56 had a thickness of 0.25 mm, and was disposed in the vertical direction to the anode-side separator plate at a curvature of a radius of 2.5 mm and an open angle of 35 degrees. The plate-shaped sealing member 56b on the anode-side linear sealing member 56 had a thickness of 0.15 mm and a width of 3 mm.

A unit cell was produced in the following manner using the same members as in Example 1, except for the use of the above-obtained linear-sealing member 56 in place of the linear sealing member 30 of Example 1.

The procedure for assembling the unit cells will be described below.

A prescribed jig for assembly with the guide pin standing thereon was placed, and the cathode-side separator plate having the cathode-side flat sealing member was disposed on the jig. The MEA was then disposed along the guide pin. Herein, the MEA was built carefully enough to prevent the cathode of the MEA from being partially placed or stacked on the periphery of the electrode placing portion 47 on the flat sealing member.

After the placement of the MEA, the anode-side linear sealing member 56 was built. Herein, 0.7 mm was secured for the clearance between the anode and the electrode sealing portion 57 on the anode-side linear sealing member 56. The anode-side separator plate 10 was then built. Since the anode-side separator plate 10 was non-transparent and the state of contact between the separator plate and the gasket thus cannot be visually observed, the anode-side separator plate 10 was built along the guide pin.

By this means, 50 unit cells were stacked, and the resultant stack was sandwiched by end plates via current collector plates and insulating plates, and then fixed with a clamping load of 600 kgf using clamping bolts so that a fuel cell was fabricated. This fuel cell was referred to as Cell D. After the clamping, the rib-shaped sealing member 56a was bent to the anode side, rendering the clearance between the anode and the electrode sealing member 57 almost non-existent. The surface pressures of the MEA and the separator plate were confirmed using pressure sensitive paper, and the surface pressure applied to the MEA was found to be 10 kgf/cm$^2$. Consequently, the reactive force to the sealing member was 100 kgf, revealing that it was possible to constitute a cell stack with sufficiently low clamping force.

Cell D was subjected to the checking for gas leakage in the same manner as in Example 1. As a result, no gas leakage was observed on the air side, the fuel gas side and the cooling water side, whereby it was confirmed that Cell D had no problem with a fluid sealing property.

After the leakage checking, Cell D of Example 2 was dissembled to confirm the building conditions of the constituent members. Although the anode of the MEA had been built slightly off the center of the anode-side linear sealing member, it was found that, in the cell of the present example, the portion to be sealed was located outside enough to sufficiently secure a sealing property at the time of the assembly.

In assembling the unit cells, after the MEA is disposed on the jig for assembly, the anode-side separator plate is built. It is preferable here that the anode of the MEA be placed at the center of the anode-side linear sealing member.

In the case of using the anode-side linear sealing member of the present example, even when the electrode was out of position due to dimensional differences, the sealing property can be secured because of a sufficient clearance between the sealing member and the electrode. Further, since it becomes possible to visually built the stack, poor sealing due to the sealing member partially placed or stacked on the electrode can be reduced.

As in Example 1, the clearance is large in building the stack; in clamping the stack, the rib-shaped sealing member is warped to the electrode side with the sealing portions in contact with the electrolyte membrane and the separator plate serving as supporting points due to the effect of the form of the sealing member of Example 2. This is attributed to the barycentric position of the rib-shaped sealing member being closer to the electrode side than the sealing portions. Herein, surface pressure required for the sealing occurs on the sealing portion due to reactive force generated out of the rigidity of the sealing member. Moreover, because the rib-shaped sealing member is warped to protrude to the electrode side, the clearance between the MEA and the sealing member can be reduced.

Further, because the sealing members are ranged in the vertical direction (stacking direction), shearing force or the bending moment will not act on the electrolyte membrane and the separator plate when the stack is clamped. For this reason, stress is not applied to the electrolyte membrane, the sealing member, the separator plate and the like, whereby there is no risk of damaging the members.

Cell D of Example 2 was kept at 75° C., and a hydrogen gas humidified and heated so as to have a dew point of 70° C. and an air humidified and heated so as to have a dew point of 60° C. were supplied to the anode side and the cathode side, respectively. As a result, the cell obtained an open-circuit voltage of 50 V at the time of non-load when electric power was not supplied to the outside. Further, it was confirmed that there were not such defects as cross-leakage of the gas and short-circuit.

Figure 15:
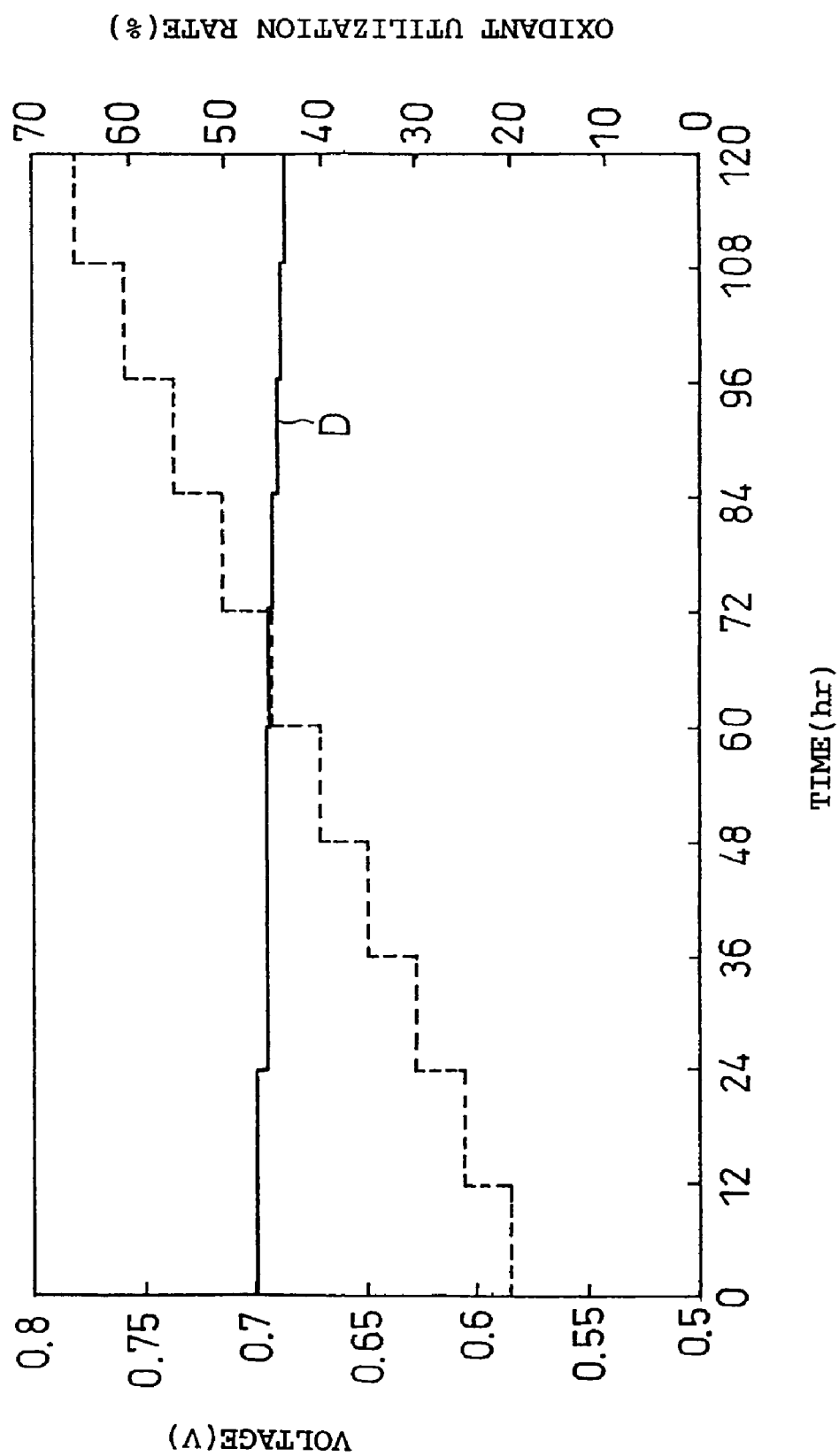
FIG. 15 is a graph showing an output characteristic of Cell D of Example 2.

In this cell D, power generation was taken place under the same conditions as in Example 1, to evaluate the stability of the power generation. The evaluation results are shown in FIG. 15. In Cell D of Example 2, the output voltage was stable until the oxidant utilization rate exceeded 65%. It was found therefrom that: in the fuel cell of Example 2, as in the case of Example 1, in building the constituent members, the clearance between the electrode and the sealing member is large; in clamping the stack, the clearance between the electrode and the sealing member is reduced due to the effect of the form of the sealing member, and an amount of the reactive gas flowing into the clearance thus decreases, thereby allowing prevention of deterioration in cell performance.

Further, because the clamping force required for clamping the fuel cell can be dramatically low, it is possible to simplify or resinify the clamping members of the stack, and the like. Namely, it is possible to compact the fuel cell and reduce the cost therefor.

EXAMPLE 3

The linear sealing member 56 was produced in the same manner as in Example 2, except that the thickness of the rib-shaped sealing member 56a on the anode-side linear sealing member 56 of Example 2 was made as thin as 0.15 mm.

Further, the linear sealing member 56 was coated with an adhesive agent. As the adhesive agent used was a copolymer of styrene and ethylenebutylene. After a toluene solution including the styrene-ethylenebutylene copolymer was applied to the linear sealing member, toluene as the solvent was removed in a drying furnace set to 50° C.

The linear sealing member 56 was disposed on the anode-side separator plate 10, which was then hot pressed while a teflon sheet was placed thereon so that the linear sealing member 56 was press-attached to the separator plate 10. Herein, the temperature was 100° C., the press load was 2000 kgf and the pressurizing time was 1 minute.

Except for the use of the anode-side separator plate 10 having the above-obtained anode-side linear sealing member 56, a unit cell was produced in the same manner as in Example 2. 50 unit cells were stacked, and the resultant stack was sandwiched by stainless-made end plates via current collector plates and insulating plates, and then fixed with a clamping load of 550 kgf using clamping bolts so that a fuel cell was fabricated. This fuel cell was referred to as Cell E. The surface pressures of the MEA and the separator plate were confirmed using pressure sensitive paper, and the surface pressure applied to the MEA was found to be 10 kgf/cm$^2$. Consequently, the reactive force to the sealing member was 50 kgf, revealing that it was possible to constitute a cell stack with very low clamping force. Moreover, the building condition was as favorable as in Examples 1 and 2.

Cell E was subjected to the checking for gas leakage in the same manner as in Example 1. As a result, no gas leakage was observed on the air side, the fuel gas side and the cooling water side, whereby it was confirmed that Cell D had no problem with a fluid sealing property.

As for assembling the cell stack, the MEA was disposed on the jig for assembly, and then the anode-side separator plate was built thereon. It is preferable here that the anode of the MEA is placed at the center of the anode-side linear sealing member.

In the case of using the rib-shaped sealing member 56a, even when the electrode is out of position due to dimensional differences, the sealing property can be secured because of a sufficient clearance between the anode-side linear sealing member and the electrode. Further, since it becomes possible to visually built the constituent members, poor sealing due to the sealing member partially placed or stacked on the electrode can be reduced.

EXAMPLE 4

A fuel cell was fabricated in the same manner as in Example 3 except that the adhesive layer of Example 3 was not used.

Cell F of Comparative Example 3 was subjected to the checking for gas leakage in the same manner as in Example 1. As a result, there was observed a tendency that external leakage of the gas and/or cross-leakage of the gas from the oxidant-gas side to the fuel gas-side occurred in part of the unit cells to lead to poor sealing.

It was confirmed from Example 3 that the use of the adhesive layer allows securement of the sealing property even by the use of such a linear sealing member as in the present example, which has relatively small sealing reactive force. Since the reactive force necessary for the sealing can be reduced, it is possible to significantly simplify or resinify the clamping members of the stack, and the like. Namely, it is possible to compact the fuel cell and reduce the cost therefor.

Further, because the sealing reactive force is very small, it is possible to reduce stress to be applied to the electrolyte membrane and the sealing member and thus to prevent the electrolyte membrane and the sealing member from being damaged, thereby allowing securement of the sealing property for a long period of time. Moreover, it is possible to prevent the cross-leakage of the reactive gas, and to prevent the electrolyte membrane from being damaged due to the cross-leakage of the gas accompanied with the poor sealing, whereby durability can be improved.

Cell E of Example 3 was kept at 75° C., and a hydrogen gas humidified and heated so as to have a dew point of 70° C. and an air humidified and heated so as to have a dew point of 60° C. were supplied to the anode side and the cathode side, respectively. As a result, the cell obtained an open-circuit voltage of 50 V at the time of non-load when electric power was not supplied to the outside. Further, it was confirmed that there were not such defects as cross-leakage of the gas and short-circuit.

Figure 16:
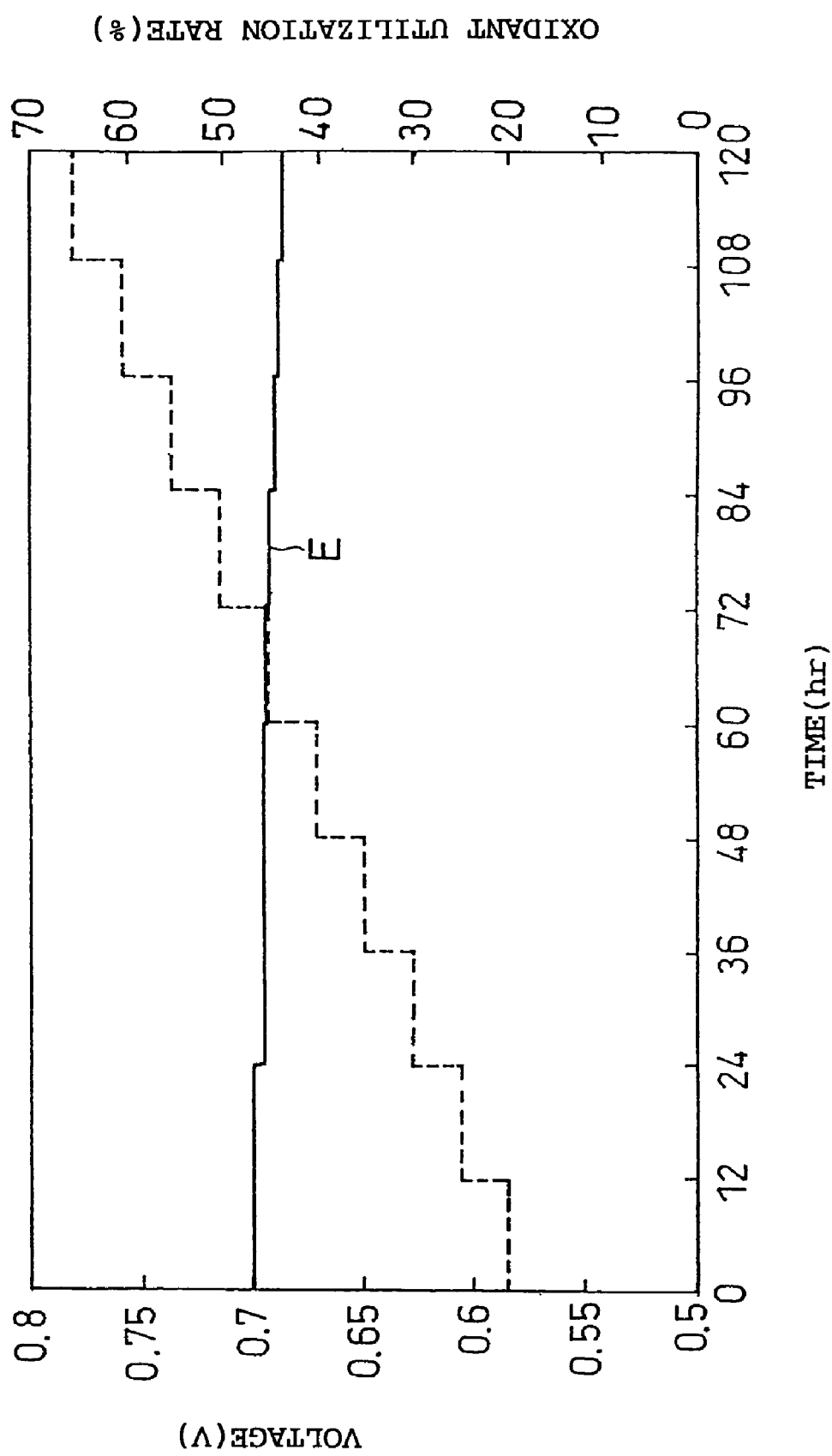
FIG. 16 is a graph showing an output characteristic of Cell E of Example 3.

In Cell E, power generation was taken place under the same conditions as in Example 1, to evaluate the stability of the power generation. The evaluation results are shown in FIG. 16. In Cell E of Example 3, the output voltage was stable until the oxidant utilization rate exceeded 65%. It was found therefrom that: in the fuel cell of Example 3, as in the case of Example 2, in building the constituent members, the clearance between the electrode and the linear sealing member is large; in clamping the stack, the clearance between the electrode and the linear sealing member is reduced due to the effect of the form of the linear sealing member, and an amount of the reactive gas flowing into the clearance thus decreases, thereby allowing prevention of deterioration in cell performance.

It is to be noted that, when the adhesive layer has no acid resistance, the same effect as in the present example can be obtained by insertion of a protective sheet such as PFA in between the electrolyte membrane and the sealing member.

EXAMPLE 5

Using a prescribed mold, the same anode-side linear sealing member as that of Embodiment 1 shown in FIGS. 11 and 12 was produced in the same manner as in Example 1.

Except for the use of this linear sealing member in place of the anode-side linear sealing member 30 used in Example 1, Fuel Cells G and H were fabricated in the same manner as in Example 1.

Further, using a prescribed mold, the same anode-side linear sealing member as that of Embodiment 2 shown in FIG. 13 was produced in the same manner as in Example 2. Except for the use of the linear sealing member shown in FIG. 13 in place of the anode-side linear sealing member of Example 2, Fuel Cell I was fabricated in the same manner as in Example 2.

Figure 17:
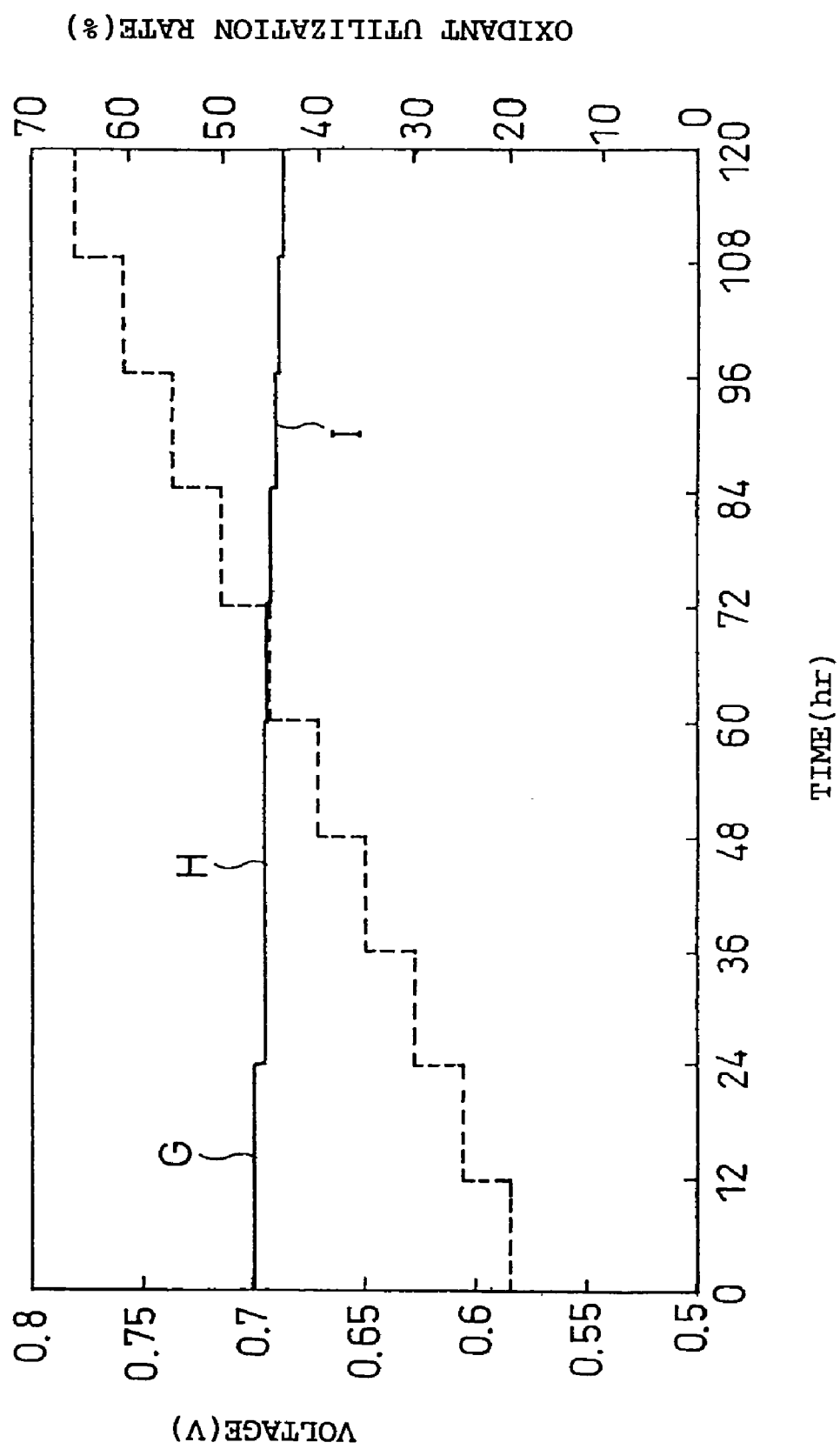
FIG. 17 is a graph showing output characteristics of Cells G to I of Example 4.

In Cells G to I, power generation was taken place under the same conditions as in Example 1, to evaluate the stability of the power generation. The evaluation results are shown in FIG. 17. It was found therefrom that an output characteristic as stable as in Examples 1 and 2 is obtained in any case.

As thus described, the polymer electrolyte fuel cell of the present invention has a highly reliable assembling property when the fuel cell is assembled, and has an excellent sealing property as well as a stable output characteristic when the fuel cell is clamped, by reducing the clearance between the sealing member and the electrode, and the cell is therefore applicable for the applications of portable power sources, power sources for portable devices, power sources for electric vehicles, domestic cogeneration systems and the like.

The invention claimed is:

1. A fuel cell comprising: an electrolyte membrane; a pair of electrodes disposed respectively on both faces of said electrolyte membrane; a pair of conductive separator plates which sandwich said electrodes and have gas flow channels for supplying reactive gases to said electrodes; and a pair of sealing means which sandwich said electrolyte membrane between said pair of separator plates and maintain hermeticity between said pair of electrodes and said pair of separator plates, wherein said pair of sealing means is constituted by combination of a flat sealing member having a flat portion in flat contact with said electrolyte membrane and of a linear sealing member having a rib in linear contact with said electrolyte membrane, wherein said rib is curved to the side of said electrode, and said rib is warped and bent to the side of said pair of electrodes when said electrolyte membrane, said pair of electrodes and said pair of separator plates are stacked to be clamped.

2. The fuel cell in accordance with claim 1, wherein said rib has a circular portion at the top thereof in contact with said electrolyte membrane in the cross section in the stacking direction, and the diameter of said circular portion is substantially not less than half of the thickness of said electrode.

3. The fuel cell in accordance with claim 1, wherein said rib is convex to the side of said electrode and is concave to the opposite side of said electrode in the cross section in the stacking direction, and part of said rib protrudes to the side of said pair of electrodes when said electrolyte membrane, said electrode and said pair of separator plates are stacked to be clamped.

4. The fuel cell in accordance with claim 1, wherein said pair of sealing means has an adhesive layer.

5. The fuel cell in accordance with claim 4, wherein said adhesive layer has acid resistance.

6. A fuel cell comprising: an electrolyte membrane; a pair of electrodes disposed respectively on both faces of said electrolyte membrane; a pair of conductive separator plates which sandwich said electrodes and have gas flow channels for supplying reactive gases to said electrodes; and a pair of sealing means which sandwich said electrolyte membrane between said pair of separator plates and maintain hermeticity between said pair of electrodes and said pair of separator plates, wherein said pair of sealing means is constituted by combination of a flat sealing member having a flat portion in flat contact with said electrolyte membrane and of a linear sealing member having a rib in linear contact with said electrolyte membrane, wherein said rib tilts to the side of said electrode, and said rib falls to the side of said electrode when said electrolyte membrane, said pair of electrodes and said pair of separator plates are stacked to be clamped.

7. The fuel cell in accordance with claim 6, wherein said rib is linear in the cross section in the stacking direction.

8. The fuel cell in accordance with claim 6, wherein said rib has a circular portion at the top thereof in contact with said electrolyte membrane in the cross section in the stacking direction, and the diameter of said circular portion is substantially not less than half of the thickness of said electrode.

9. The fuel cell in accordance with claim 6, wherein said pair of sealing means has an adhesive layer.

10. The fuel cell in accordance with claim 9, wherein said adhesive layer has acid resistance.

11. A fuel cell comprising: an electrolyte membrane; a pair of electrodes disposed respectively on both faces of said electrolyte membrane; a pair of conductive separator plates which sandwich said electrodes and have gas flow channels for supplying reactive gases to said electrodes; and a pair of sealing means disposed at least along a part of peripheries of said pair of electrodes which sandwich said electrolyte membrane between said pair of separator plates and maintain hermeticity between said pair of electrodes and said pair of separator plates, wherein said pair of sealing means is constituted by combination of a flat sealing member having a flat portion in flat contact with said electrolyte membrane and of a linear sealing member having a rib in linear contact with said electrolyte membrane, wherein said rib is curved to the side of said electrode, and said rib is warped and bent to the side of said pair of electrodes when said electrolyte membrane, said pair of electrodes and said pair of separator plates are stacked to be clamped.

12. A fuel cell comprising: an electrolyte membrane; a pair of electrodes disposed respectively on both faces of said electrolyte membrane; a pair of conductive separator plates which sandwich said electrodes and have gas flow channels for supplying reactive gases to said electrodes; and a pair of sealing means disposed at least along a part of peripheries of said pair of electrodes which sandwich said electrolyte membrane between said pair of separator plates and maintain hermeticity between said pair of electrodes and said pair of separator plates, wherein said pair of sealing means is constituted by combination of a flat sealing member having a flat portion in flat contact with said electrolyte membrane and of a linear sealing member having a rib in linear contact with said electrolyte membrane, wherein said rib tilts to the side of said electrode, and said rib falls to the side of said electrode when said electrolyte membrane, said pair of electrodes and said pair of separator plates are stacked to be clamped.

* * * * *

UNITED STATES PATENT AND TRADEMARK OFFICE
CERTIFICATE OF CORRECTION

PATENT NO. : 7,416,807 B2
APPLICATION NO. : 10/899987
DATED : August 26, 2008
INVENTOR(S) : Hideo Ohara et al.

It is certified that error appears in the above-identified patent and that said Letters Patent is hereby corrected as shown below:

Title Page:

Section (54), the title should read -- POLYMER ELECTROLYTE FUEL CELL WITH A SEAL FEATURE --;
Section (57), in the penultimate line of the Abstract, "cramped" should read -- clamped --.

Signed and Sealed this

Eighth Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,416,807 B2  Page 1 of 1
APPLICATION NO. : 10/899987
DATED : August 26, 2008
INVENTOR(S) : Hideo Ohara et al.

It is certified that error appears in the above-identified patent and that said Letters Patent is hereby corrected as shown below:

Title Page, Section (54) and Column 1, line 1, the title should read -- POLYMER ELECTROLYTE FUEL CELL WITH A SEAL FEATURE --;

Title Page, Section (57), in the penultimate line of the Abstract, "cramped" should read -- clamped --.

This certificate supersedes the Certificate of Correction issued September 8, 2009.

Signed and Sealed this

Twenty-ninth Day of September, 2009

David J. Kappos
*Director of the United States Patent and Trademark Office*